US007778243B2

(12) United States Patent
Yamaguchi et al.

(10) Patent No.: US 7,778,243 B2
(45) Date of Patent: Aug. 17, 2010

(54) METHOD FOR DTMF TRANSFER BY RTP

(75) Inventors: Yoshie Yamaguchi, Fukushima-ken (JP); Masahito Hirokawa, Fukushima-ken (JP); Makoto Kumada, Fukushima-ken (JP); Yusuke Sato, Fukushima-ken (JP); Masayuki Ono, Fukushima-ken (JP)

(73) Assignee: Hitachi, Ltd., Tokyo (JP)

( * ) Notice: Subject to any disclaimer, the term of this patent is extended or adjusted under 35 U.S.C. 154(b) by 514 days.

(21) Appl. No.: 11/214,863

(22) Filed: Aug. 31, 2005

(65) Prior Publication Data
US 2006/0120344 A1 Jun. 8, 2006

(30) Foreign Application Priority Data

Dec. 2, 2004 (JP) ............................. 2004-350224
Aug. 15, 2005 (JP) ............................. 2005-235277

(51) Int. Cl.
*H04L 12/66* (2006.01)
(52) U.S. Cl. .................. 370/356; 379/142.18; 370/351; 370/401; 370/389
(58) Field of Classification Search ................ 370/259, 370/260, 261, 352, 356, 389, 400, 401; 379/219, 379/221.02, 221.08, 221.1, 228, 88.17, 418, 379/229, 207.02, 265.09, 142.18
See application file for complete search history.

(56) References Cited

U.S. PATENT DOCUMENTS 5,894,478 A * 4/1999 Barzegar et al. ............ 370/401

6,842,447 B1 * 1/2005 Cannon ....................... 370/352
6,934,756 B2 * 8/2005 Maes .......................... 709/227
7,230,945 B2 * 6/2007 Yeom ......................... 370/352
2005/0169244 A1 * 8/2005 Luken ........................ 370/352
2005/0243872 A1 * 11/2005 Monai ........................ 370/525

FOREIGN PATENT DOCUMENTS

JP          2003-174466          6/2003
WO          WO 03077521 A1 *    9/2003

OTHER PUBLICATIONS

English translation of WO 03077521 A1, Author:Luken, Title: Control of packets network-based service servers using in particular DTMF signals.*

* cited by examiner

*Primary Examiner*—Ahmad F Matar
*Assistant Examiner*—Antim Shah
(74) *Attorney, Agent, or Firm*—Antonelli, Terry, Stout & Kraus, LLP.

(57) ABSTRACT

A method for DTMF transmission between different address systems in a communication system containing a first network (NW) 20A including an SIP terminal 41A connected to an SIP server 30A, a second network (NW) 20B including an SIP terminal 41B connected to an SIP server 30B, and an SIP converter 10 connecting the first and the second NWs. When the SIP converter 10 detects coded DTMF information from one of the NWs while a session is established between the SIP terminal 41A and the SIP terminal 41B, the SIP converter 10 determines whether the other of the NWs supports the coded DTMF information. If the other of the NWs does not support the coded DTMF information, the SIP converter 10 stores voice-data DTMF corresponding to the coded DTMF information into a payload of RTP and transfers the information to the SIP terminal of the other network.

9 Claims, 6 Drawing Sheets

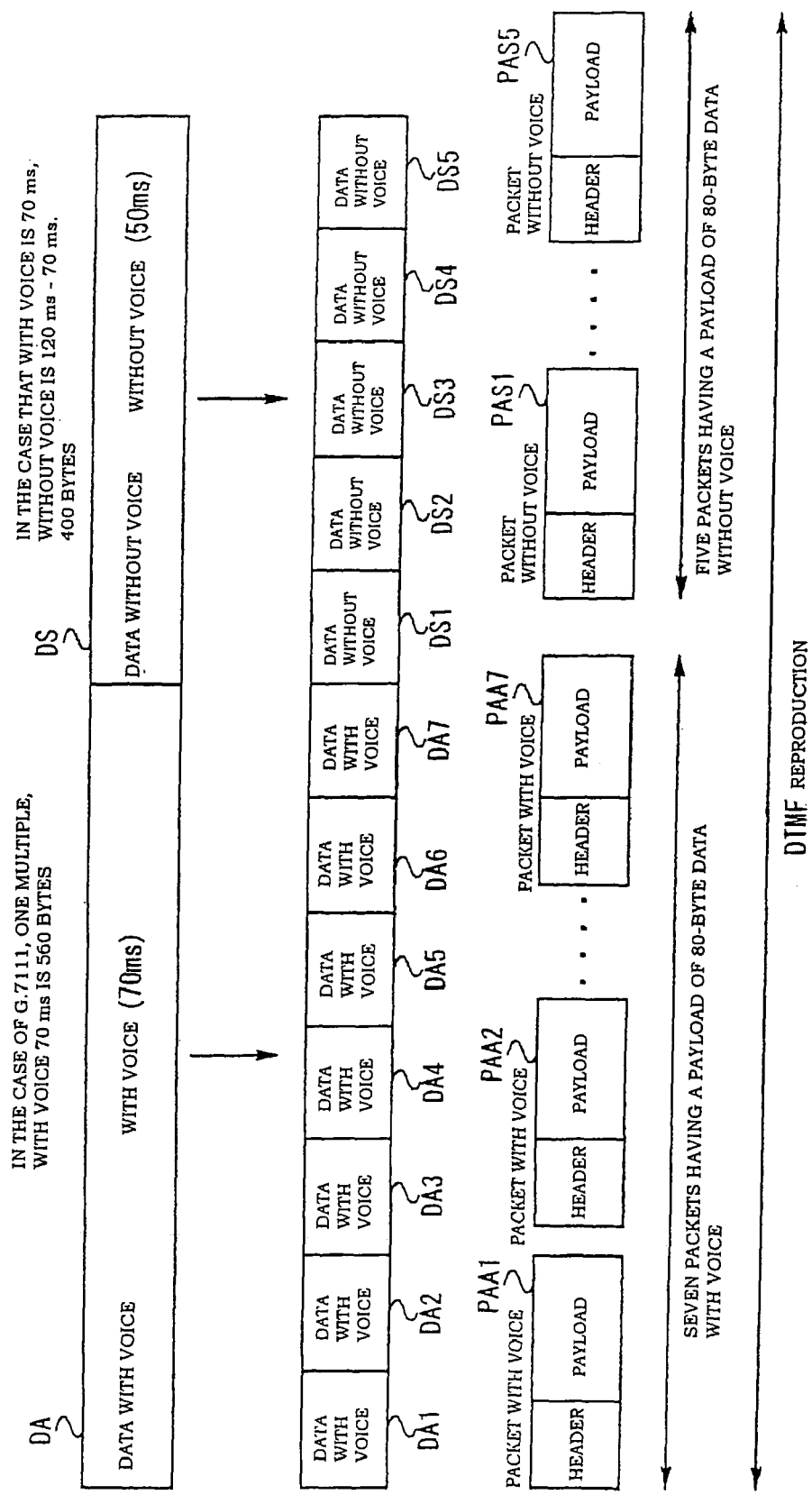

METHOD FOR DTMF TRANSFER BY RTP

BACKGROUND OF THE INVENTION

1. Field of the Invention

The present invention relates to a DTMF transfer method and a relay apparatus for transferring DTMF (Dual Tone Multi-Frequency) voice data on RTP (Transport Protocol for Real Time Applications) in an IP communication system using SIP (Session Initiation Protocol)(RFC3261 defined by IETF: The Internet Engineering Task Force).

2. Description of the Related Art

In recent years, VoIP (Voice over Internet Protocol) services are on the rise with the development of IP (Internet Protocol) networks. The VoIP services are techniques for transmitting/receiving voice data on IP networks. In VoIP, a virtual session is established between communication apparatuses. The IP-packetized voice data is transmitted over the established session. Session control protocols are required for controlling the establishment, maintenance, and disconnection of a session between communication apparatuses. Since SIP (Session Initiation Protocol) has high expandability of functions among them, SIP attracts attention as a session control protocol for VoIP. The SIP is an application protocol which uses a trans-interface mechanism, such as TCP (Transmission Control Protocol), UDP (User Datagram Protocol), etc. The SIP, which is a text-based protocols includes a header part for conveying a request or a response and a message body for describing the contents of a session. The description of an SIP session conforms to SDP (Session Description Protocol) (RFC2327 defined by IETF), etc.

In the following, a description will be given of the connection procedure by the SIP using FIGS. 1 and 2. FIG. 1 is an example of a system configuration for performing telephone communication in networks 20A and 20B through servers 30A and 30B using the SIP. The networks 20A and 20B individually include the SIP servers 30A and 30B, SIP terminals 41A-1 to 41A-3 and 41B-1 to 41B-3 connected to the SIP servers 30A and 30B through LANs 40A and 40B, and telephones 45A-1 to 45A-3 and 45B-1 to 45B-3 connected to the SIP terminals 41A-1 to 41A-3 and 41B-1 to 41B-3, respectively. The telephones 45A-1 to 45A-3 and 45B-1 to 45B-3 are connected under the SIP terminals 41A-1 to 41A-3 and 41B-1 to 41B-3. However, the apparatuses are not necessarily telephones. If the SIP terminal 41A-1 to 41A-3 and 41B-1 to 41B-3 can terminate telephone communication, for example, in the case where the SIP terminals 41A-1 to 41A-3 and 41B-1 to 41B-3 are SIP telephones, there may be nothing connected under the terminal.

FIG. 2 illustrates a sequence for establishing a session between the SIP terminal 41A-1 and SIP terminal 41A-2 in the same network 20. When the SIP terminal 41A-1 receives an [origination] signal from the telephone 45A-1 (S1), the SIP terminal 41A-1 transmits [INVITE], which is a message including the description of the addresses of the other party's SIP terminal 41A-2 to which a call is placed and the other party's telephone 45A-2 to the SIP server 30A (S2). The SIP server 30A transmits a temporary response, [100], to the SIP terminal 41A-1 which has transmitted [INVITE] (S3), identifies the location information of the SIP terminal 41A-2 from the description of the [INVITE], and transmits the [INVITE] for requesting call placing to the SIP terminal 41A-2 (S4).

The SIP terminal 41A-2 performs [calling] to the telephone 45A-2 (S5), transmits the temporary response, [100] (S6), and then transmits a temporary response, [180], to the SIP server 30A (S7). When the SIP server 30A receives the response, the SIP server 30A transmits a temporary response, [180], to the SIP terminal 41A-1 in the same manner (S8).

When the SIP terminal 41A-2 receives the [response] made by the telephone 45A-2 (S9), the SIP terminal 41A-2 transmits response [200], which is a message indicating the acceptance of a call to the SIP server 30A (S10). The SIP server 30A that has received the response [200] transmits the response [200] to the SIP terminal 41A-1 (S11). The SIP terminal 41A-1 that has received the response [200] transmits an acknowledgment [ACK], which is an acknowledgement message, to the SIP server 30A (S12). Similarly, the SIP server 30A transmits the acknowledgment [ACK] to the SIP terminal 41A-2 (S13).

As described above, a session between the SIP terminal 41A-1 and the SIP terminal 41A-2 is established (S14), and the telephone communication between the telephone 45A-1 and the telephones 45A-2 by RTP (Transport Protocol for Real Time Applications) (RFC1889/RFC3350 defined by IETF) becomes possible (S15). In general, the call placing request, [INVITE], and the response [200] include information (session information) for transferring a voice packet between the SIP terminal 41A-1 and the SIP terminal 41A-2. The SDP, etc., is used for the description of the session information. By conforming the specifications of the SIP and the SDP, it is possible to specify the SIP terminal information and the SIP server information by an IP address. Also, the session information is sometimes included in the temporary response [180], and it is possible to transmit/receive voice before the response [200].

On the other hand, since IP networks have become widespread rapidly, a technique for the interconnection between areas (networks) having different IP address (in the following, simply called "address") systems and the interconnection of SIP protocols having original headers, etc., becomes necessary. For the interconnection between areas having different address systems, the problem has been able to be solved by using an apparatus for converting addresses as disclosed in Japanese Unexamined Patent Application Publication No. 2003-174466.

A description will be given of the case where an apparatus having a function of recognizing and transmitting dial (a push-button signal constructed by DTMF) by DTMF (Dual Tone Multi-Frequency) voice data such as a telephone, a PBX (Private Branch Exchange), etc., is connected under an SIP terminal in a system configuration using an address-conversion apparatus using FIGS. 1 and 3. Here, an SIP converter 10 in FIG. 1 is assumed to be an address-conversion apparatus between the networks having different address systems. FIG. 1 is an example of a communication system for performing telephone communication using SIP. FIG. 3 illustrates a sequence of dial transmission/receiving after a session is established between the SIP terminal 41A-1 in the first network 20A and the SIP terminal 41B-1 in the second network 20B.

In a system in which a session has been established by SIP, there are two types of methods for performing transmission/receiving dial (a push-button signal constructed by DTMF). The first method is a method in which the DTMF is packetized as voice data and transmitted by RTP similarly as usual voice data without the detection of DTMF by an apparatus terminating SIP. The second method is a method in which the DTMF detection is performed, the detected DTMF is converted into coded DTMF information (coded DTMF information different from voice data) in a predetermined format, and is transmitted to an opposite apparatus. The opposite apparatus that has received this coded DTMF information decodes this into DTMF as voice data to reproduce the data or recognizes the transmitted DTMF based on the coded DTMF information.

As an example of the second method, there is a method in which DTMF is transmitted using the [INFO] method in SIP. In this regard, the [INFO] method is defined as an RFC2976 by IETF. In the [INFO] method, information such as the type of (push-button information of 0 to 9, #, *, A to D) DTMF to be reproduced, DTMF reproduction time, etc., are described as coded DTMF information. When an apparatus terminating SIP (DTMF transmission apparatus) detects DTMF, the DTMF is converted into the [INFO] method, which describes the type of DTMF corresponding to the detected DTMF and the reproduction time reproduction time, and transmits it to the opposite apparatus. The opposite apparatus (DTMF receiving apparatus) converts the coded DTMF information (the type of DTMF and the reproduction time) in the [INFO] method into the DTMF as the original voice data.

Also, as another example of the second method, there is a method in which when DTMF is detected, the coded DTMF information corresponding to the detected DTMF is stored in the payload area of the RTP, and is transmitted to the opposite apparatus (DTMF receiving apparatus). This method is defined as RFC2833 by IETF, and includes a description of information such as the type of DTMF to be reproduced (push-button information of 0 to 9, #, *, A to D), the DTMF reproduction time, etc., as the coded DTMF information. The opposite apparatus (DTMF receiving apparatus) converts the coded DTMF information (the type of DTMF, the reproduction time, etc.) in RTP into the DTMF as the original voice data.

First, a description will be given of the first method using FIG. 3. While a session is established between the SIP terminal 41A-1 of the first network 20A and the SIP terminal 41B-1 of the second network 20B (S21), when the SIP terminal 41A-1 receives DTMF from the telephone 45A-1 (S22), the DTMF is not detected, and the voice data corresponding to the DTMF is transmitted to the SIP terminal 41B-1 as voice data on RTP in the same manner as normal voice (S23). The SIP terminal 41B-1 notifies the voice data (DTMF) in the RTP to the telephone 45B-1 (S24).

A description will be given of the second method using FIG. 3. In this regard, in the following description of the present invention, the term "coded DTMF information" is used by defining as coded information produced by coding (a form in which information such as the type of DTMF, the reproduction time, etc., is represented by data) DTMF as voice data into a predetermined format different from the voice data using the [INFO] method based on RFC2976 by IETF or "RTP storing coded DTMF information" based on RFC2833 by IETF. Accordingly, "coded DTMF information" is used as information different from the voice information produced by storing DTMF into RTP as voice data.

While a session is established between the SIP terminal 41A-1 of the first network 20A and the SIP terminal 41B-1 of the second network 20B (S21), when the SIP terminal 41A-1 detects DTMF from the telephone 45A-1 (S31), the coded DTMF information containing the description of the type of the detected DTMF and the reproduction time is created, and the coded DTMF information is transmitted to the SIP server 30A (S32). The SIP server 30A transmits the coded DTMF information to the SIP converter 10 which is an apparatus for performing address conversion (S33). The SIP converter 10 performs address conversion between the networks having different address system on the transmitted coded DTMF information (S34), and transmits the coded DTMF information containing the description of the type of the detected DTMF and the reproduction time of the second network 20B to the SIP server 30B (S35). The SIP server 30B transmits the coded DTMF information to the SIP terminal 41B-1 (S36). The SIP terminal 41B-1 determines the type of DTMF and the reproduction time from the coded DTMF information, and transmits the DTMF to the telephone 45B-1 using the DTMF reproduction apparatus including a DTMF-signal transmitter, etc. (S37).

When the second method is used, if the SIP terminal 41B-1 of the second network 20B does not have the DTMF reproduction function corresponding to the coded DTMF information (that is to say, if the SIP terminal 41B-1 does not support the [INFO] method processing based on RFC2976 by IETF or "RTP storing coded DTMF information" processing based on RFC2833 by IETF), the received coded DTMF information is not reproduced to DTMF. Thus, if an apparatus, which transmits and recognizes DTMF, such as a telephone, a PBX, etc., is connected under an SIP terminal, problems sometimes arise in that information is not normally transferred, a telephone is not connected, transfer is not possible, etc. In this manner, when the SIP terminals connected to an address conversion apparatus include an apparatus supporting the [INFO] method processing based on RFC2976 by IETF or "RTP storing coded DTMF information" processing based on RFC2833 by IETF and an apparatus not supporting the processing, there have been various problems so far.

Accordingly, it is an object of the present invention to provide a method for DTMF transfer which allows normal DTMF transmission between SIP terminals even if a communication system includes an SIP terminal which supports the [INFO] method processing based on RFC2976 by IETF or "RTP storing coded DTMF information" processing based on RFC2833 by IETF and an SIP terminal which does not support the [INFO] method processing based on RFC2976 by IETF or "RTP storing coded DTMF information" processing based on RFC2833 by IETF.

SUMMARY OF THE INVENTION

In the DTMF reproduction system of the present invention, when the SIP conversion receive the coded DTMF information, if the receiving side does not support the [INFO] method processing based on RFC2976 by IETF or "RTP storing coded DTMF information" processing based on RFC2833 by IETF, the DTMF voice data is loaded on the RTP, and is transmitted in order to allow the SIP terminal to reproduce DTMF.

In order to solve the above-described problems, according to the present invention, there is provided a method for DTMF transfer between different address systems in a communication system containing a first network including an SIP server using SIP and an SIP terminal connected to the SIP server through a network, a second network including an SIP server using SIP and an SIP terminal connected to the SIP server through a network, and an SIP converter for connecting the first network and second network, the method including the steps of: while a session is established between the first-network SIP terminal and the second-network SIP terminal, the SIP converter determining whether the SIP terminal of the other of the networks supports coded DTMF information when the SIP converter detects the coded DTMF information from one of the networks; and the SIP converter storing voice-data format DTMF into a payload on RTP and transmitting the information to the other of the SIP terminals if the other of the networks does not support the coded DTMF information. Whether the SIP terminal to be the target supports coded DTMF information or not is determined by the Allow header in the method received before the coded DTMF information is received.

In the present invention, in the method for the DTMF transfer, the SIP terminal of the coded DTMF information receiving side may extract DTMF from the received voice packet on RTP. Furthermore, a payload of the voice packet on RTP may be changed by SIP session information. A header of the voice packet on RTP may be either an UDP header or a TCP header.

According to the present invention, there is provided an SIP relay apparatus for relaying communication between a first SIP terminal using SIP and a second SIP terminal, the SIP relay apparatus including: a function of determining whether the other of the SIP terminal supports the coded DTMF information when the SIP relay apparatus detects the coded DTMF information from one of the SIP terminals while a session is established between the first SIP terminal and the second SIP terminal; and a function of storing voice-data format DTMF corresponding to the coded DTMF information into a payload on RTP and transmitting the information to the other of the SIP terminals if the other of the SIP terminals does not support the coded DTMF information.

As described above, according to the DTMF reproduction system of the present invention, even if there are an SIP terminal which supports coded DTMF information processing, that is to say, "the [INFO] method processing based on RFC2976 by IETF or "RTP storing coded DTMF information" processing based on RFC2833 by IETF", and an SIP terminal which does not support the coded DTMF information processing at the same time, it becomes possible to transmit DTMF normally between the SIP terminals. Accordingly, even if an apparatus, which transmits and recognizes DTMF, such as a telephone, a PBX, etc., is connected under an SIP terminal, it becomes possible to normally transfer information.

BRIEF DESCRIPTION OF THE DRAWINGS

FIG. 7 is an explanatory diagram illustrating a DTMF transmission method in a DTMF reproduction system of the present invention.

DESCRIPTION OF THE PREFERRED EMBODIMENTS

Figure 1:
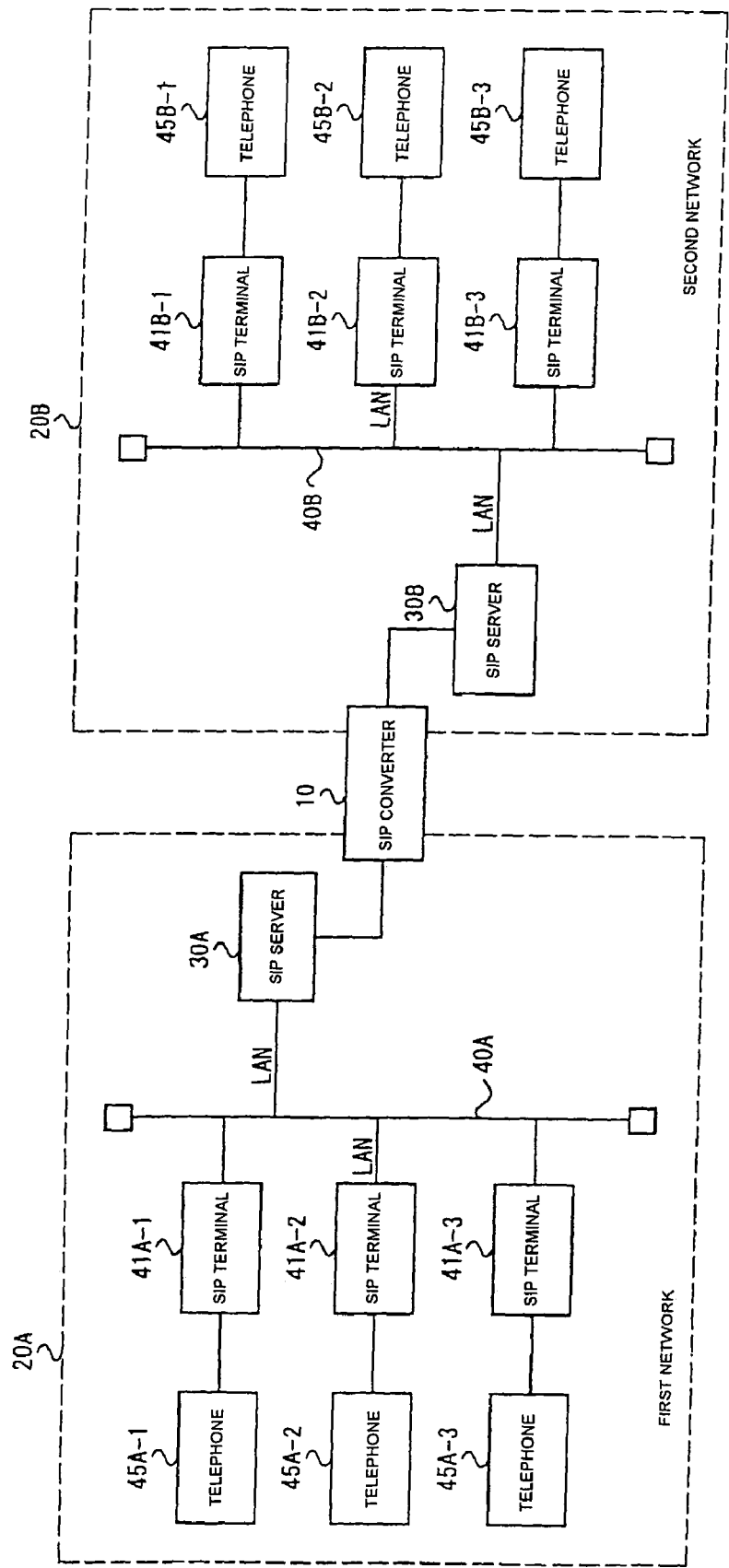
FIG. 1 is an explanatory diagram illustrating an example of a communication system using SIP.
Figure 2:
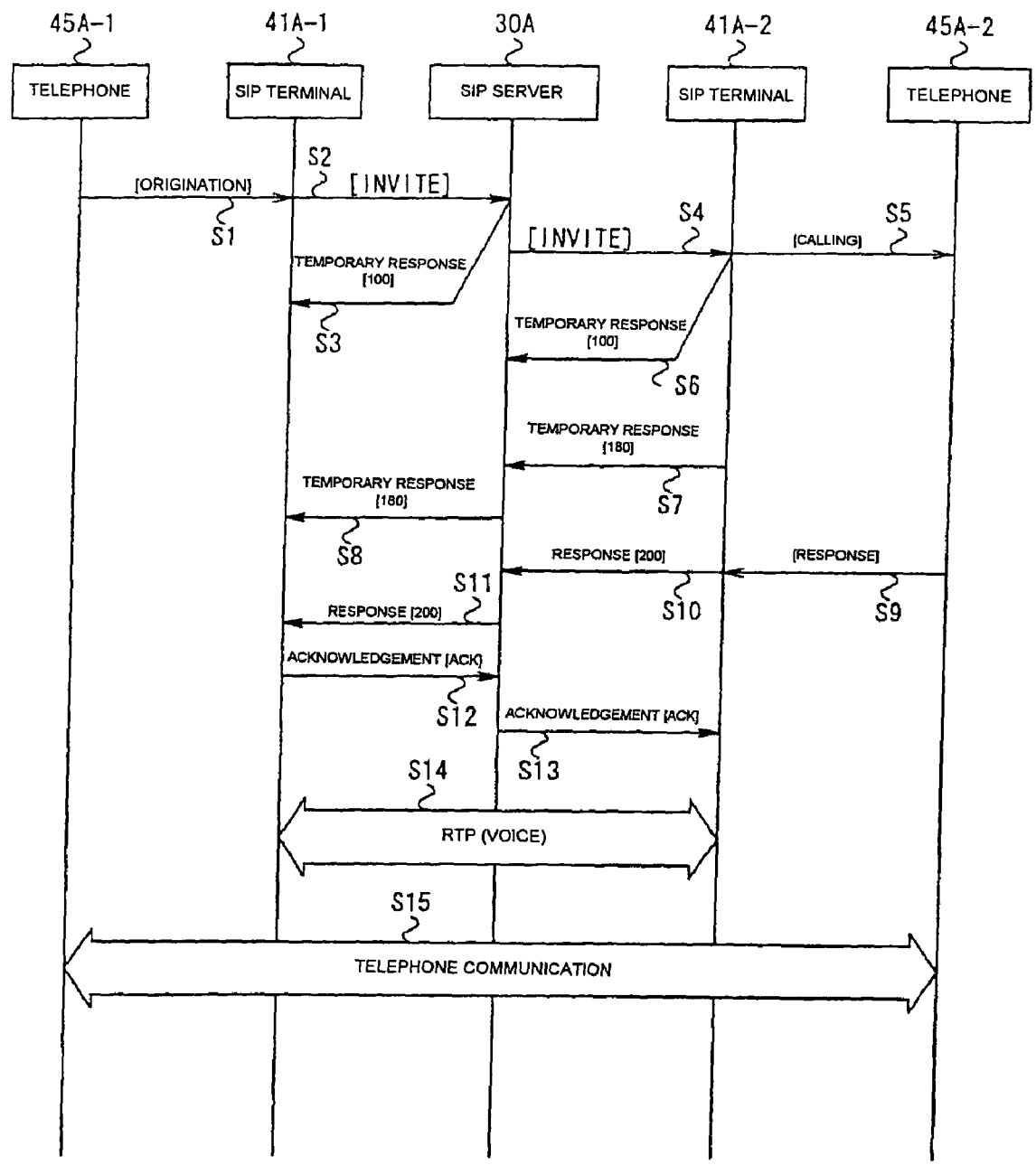
FIG. 2 is a sequence diagram illustrating establishment of a session by SIP.
Figure 3:
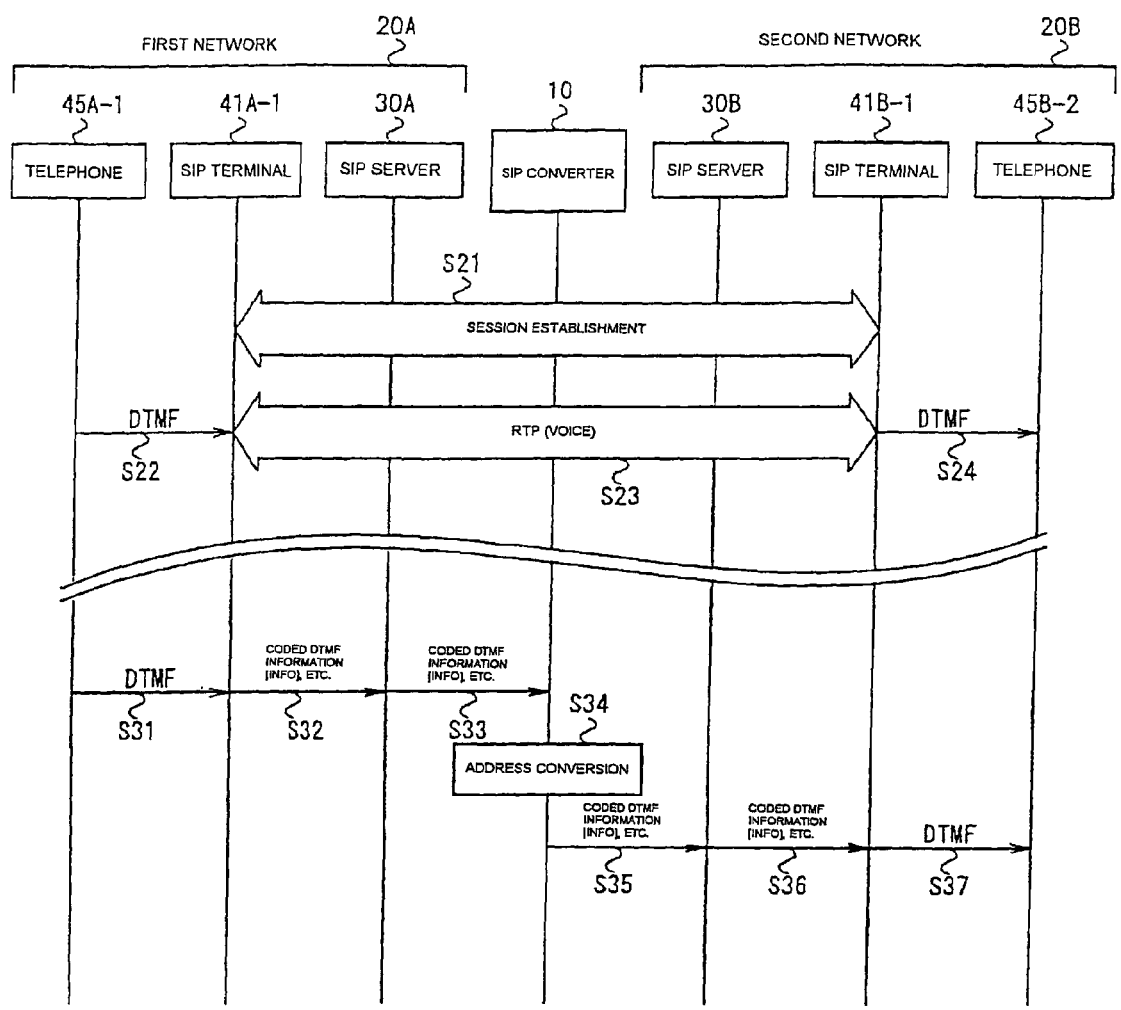
FIG. 3 is a sequence diagram showing known DTMF transmission/reproduction.
Figure 4:
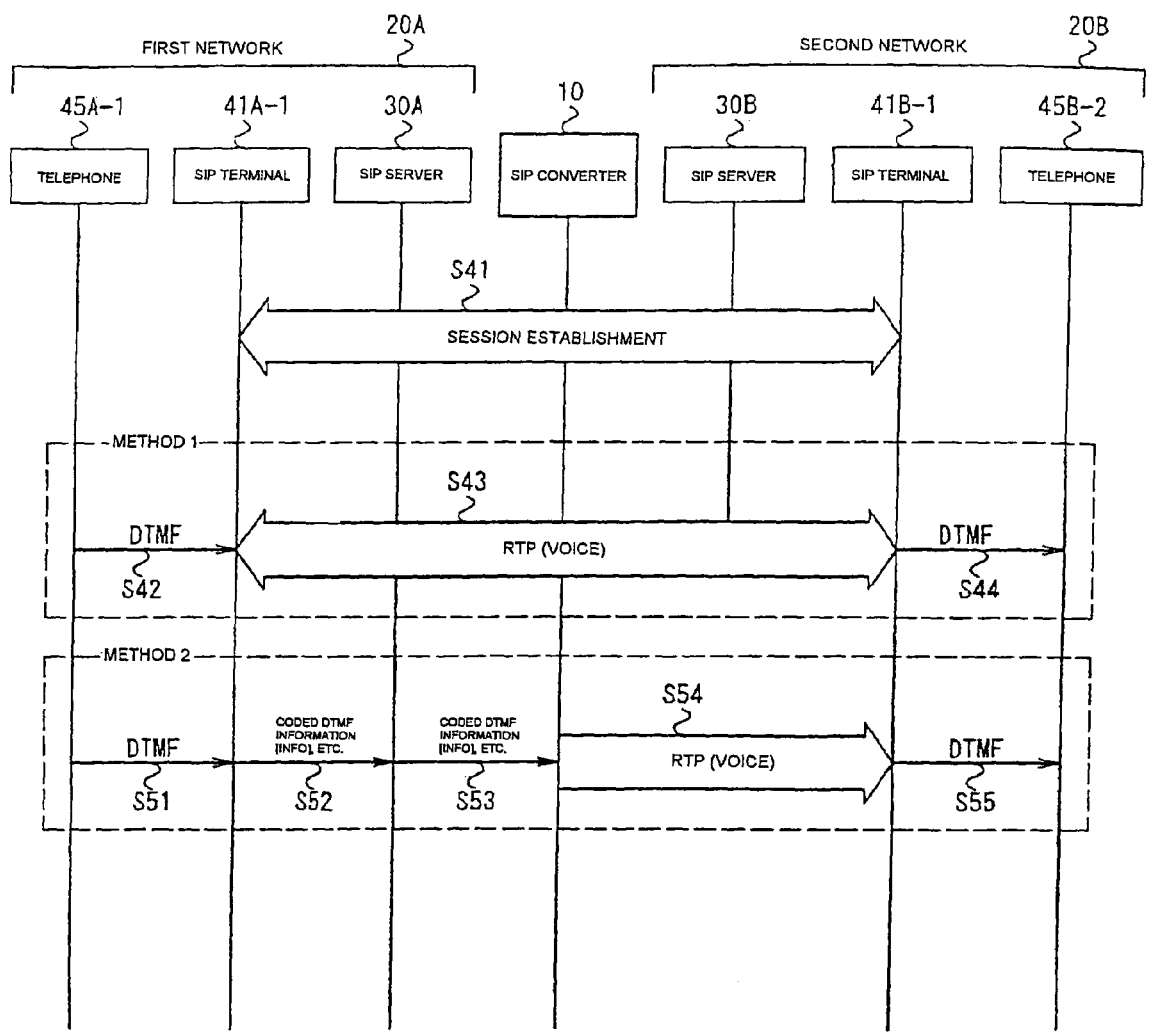
FIG. 4 is a sequence diagram showing DTMF transmission/reproduction according to the present invention.

A description will be given of an embodiment of the present invention using the drawings. Here, a communication system shown in FIG. 1 employs a DTMF reproduction system by RTP of the present invention, in which an SIP converter 10 performs address conversion between networks having different address systems, loads DTMF on RTP for sending to an SIP terminal, and the SIP terminal performs reproduction of DTMF. FIG. 1 is a configuration diagram of a communication system using the present invention. FIG. 4 illustrates a sequence of dial transmission/reproduction after the establishment of a session between an SIP terminal 41A-1 and an SIP terminal 41B-1.

In FIG. 1, a first network 20A includes SIP terminals 41A-1 to 41A-3, to which telephones 45A-1 to 45A-3 are connected, respectively, connected to an SIP server 30A through a LAN 40A. Similarly, a second network 20B includes SIP terminals 41B-1 to 41B-3, to which telephones 45B-1 to 45B-3 are connected, respectively, connected to an SIP server 30B through a LAN 40B. The SIP server 30A of the first network 20A and the SIP server 30B of the second network 20B are connected through an SIP converter 10.

First, a description will be given below of two kinds of methods for transmitting/receiving dial between SIP terminals in a state of the establishment of a session by SIP. A description will be given of the first method using FIG. 4. Suppose that neither the SIP terminal 41A-1 of the first network 20A nor the SIP terminal 41B-1 of the second network 20B supports the coded DTMF information processing, that is to say, the [INFO] method processing based on RFC2976 by IETF or "RTP storing coded DTMF information" processing based on RFC2833 by IETF at this time. While a session is established between the SIP terminal 41A-1 of the first network 20A and the SIP terminal 41B-1 of the second network 20B (S41), when the SIP terminal 41A-1 receives DTMF from the telephone 45A-1 (S42), the DTMF is not converted into the coded DTMF information is not performed, and the DTMF is transmitted to the SIP terminal 41B-1 as data on RTP in the same manner as normal voice (S43). The SIP terminal 41B-1 transmits the DTMF (voice data) on RTP to the telephone 45B-1 (S44). This method is the same as the known technique. The SIP terminal 41A-1, the SIP terminal 41B-1, the SIP server 30A, the SIP server 30B, and the SIP converter 10 are not aware of the DTMF.

A description will be given of the second method using FIG. 4. Suppose that the SIP terminal 41A-1 of the first network 20A supports the coded DTMF information processing, that is to say, the [INFO] method processing based on RFC2976 by IETF or "RTP storing coded DTMF information" processing based on RFC2833 by IETF, and the SIP terminal 41B-1 of the second network 20B does not support the coded DTMF information processing at this time. While a session is established between the SIP-terminal 41A-1 and the SIP terminal 41B-1 (S41), when the SIP terminal 41A-1 detects DTMF from the telephone 45A-1 (S51), the SIP terminal 41A-1 transmits the coded DTMF information, in which a type of DTMF and a reproduction time are described, to the SIP server 30A (S52). The SIP server 30A that has received the coded DTMF information transmits the coded DTMF information to the SIP converter 10 (S53). The SIP converter 10 knows that the SIP terminal of the second network 20B does not support the coded DTMF information, and thus the SIP converter 10 determines the type of DTMF, the reproduction time from the received coded DTMF information, creates DTMF data (voice data) in accordance with the information thereof, and transmits the data to the SIP terminal 41B-1 on RTP through the SIP server 30B (S54). The SIP terminal 41B-1 reproduces DTMF from the DTMF data on RTP, and transmits the DTMF to the telephone 45B-1 (S55). Thus, it is possible for the SIP terminal 41B-1, which does not support the coded DTMF information processing, to transmit the DTMF in the same manner as ordinary voice.

In this regard, a determination on whether or not the SIP terminal of the second network 20B supports coded DTMF information processing may be made by the determination of the Allow header in the method received before the coded DTMF information is received, or may be made based on the information set and stored in advance. When a determination is made based on the information set and stored in advance, if the setting information is not provided on the corresponding apparatus, it is desirable to perform processing assuming that the coded DTMF information processing is not supported.

Figure 5:
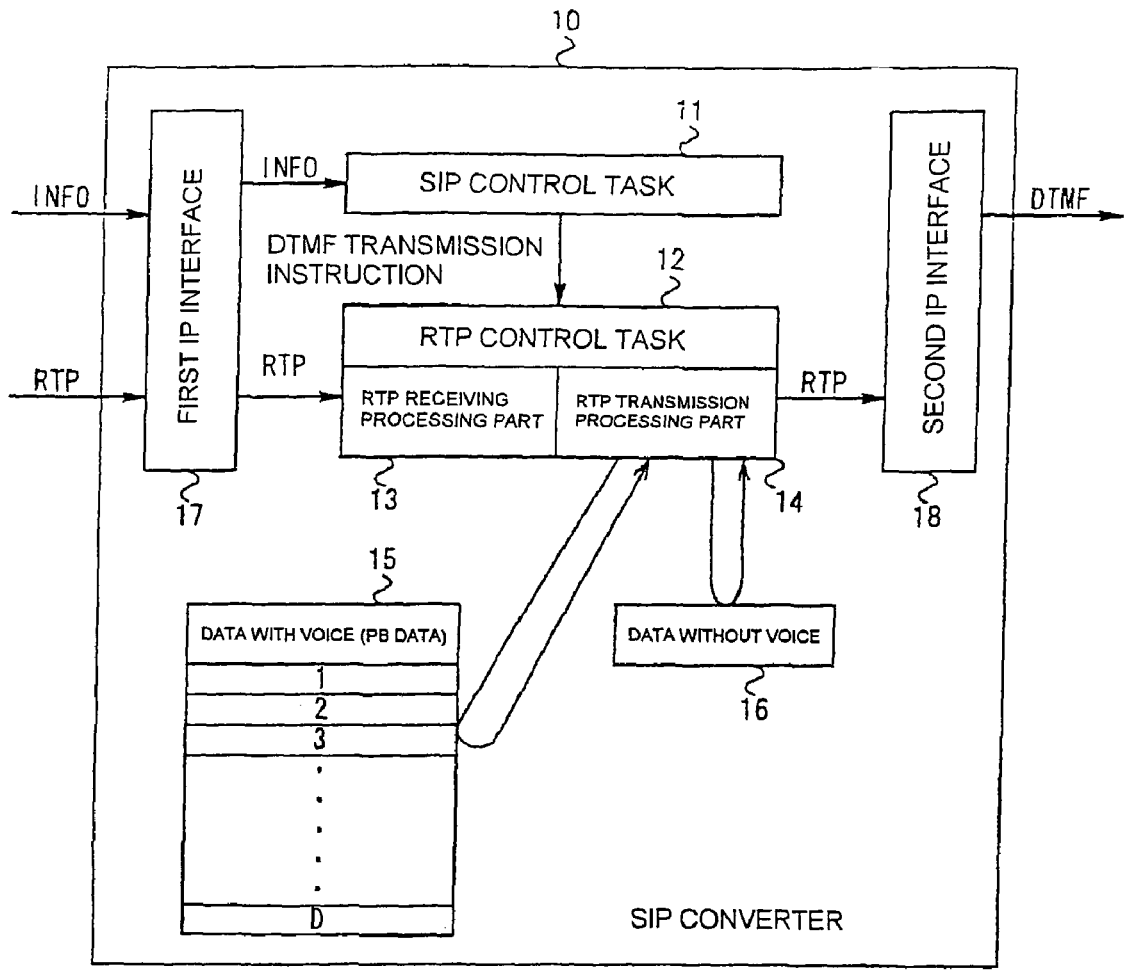
FIG. 5 is a task configuration diagram of an SIP converter according to the present invention.

Next, a description will be given of the functional configuration of the SIP converter 10, which is means for receiving the coded DTMF information and transmitting DTMF as RTP voice data using FIGS. 5 to 7. FIG. 5 is a task configuration diagram of the SIP converter 10 to which the DTMF reproduction system by RTP of the present invention is employed. The SIP converter 10 includes an SIP control task 11, an RTP control task 12, an RTP receiving processor 13, an RTP transmission processor 14, data with voice 15, data without voice 16, a first IP interface 17, and a second IP interface 18.

The SIP control task 11 has a protocol-conversion function as described below. When the SIP control task 11 receives the coded DTMF information ([INFO] method) received through the first IP interface 17, the SIP control task 11 determines whether or not the SIP terminal of the opposite network supports the coded DTMF information ([INFO] method) processing. If the SIP terminal supports the processing, address conversion is performed into the address format of the opposite network, and the coded DTMF information ([INFO] method) after address conversion is transmitted to the opposite network through the second IP interface 18. Also, when the SIP control task 11 receives the coded DTMF information ([INFO] method) received through the first IP interface 17, the SIP control task 11 determines that the SIP terminal of the opposite network does not support the coded DTMF information ([INFO] method) processing and if the conversion from the type of DTMF and the reproduction time, which is the contents of the coded DTMF information ([INFO] method), etc., into the DTMF voice data on RTP is necessary, the SIP control task 11 instructs the RTP control task 12 to load the DTMF data on RTP and transmit it.

The RTP control task 12 includes the RTP receiving processor 13 and the RTP transmission processor 14, and has a function of loading the DTMF voice data on the RTP received through the first IP interface 17 based on the instruction from the SIP control task 11 and pushing out the RTP through the second IP interface 18. Also, when the RTP control task 12 receives the coded DTMF information (RPT storing the coded DTMF information) received through the first IP interface 17, the RTP control task 12 determines that the SIP terminal of the opposite network does not support the coded DTMF information (RPT storing the coded DTMF information) processing and if the conversion from the type of DTMF and the reproduction time, which is the contents of the coded DTMF information (RPT storing the coded DTMF information), etc., into the DTMF voice data on RTP is necessary, the RTP control task 12 loads the DTMF voice data on RTP and pushes out the RTP through the second IP interface 18.

The RTP receiving processor 13 is a processor for performing the receiving processing of the RTP input through the first IP interface 17.

The RTP transmission processor 14 is means for transmitting an RTP voice packet loaded with data having voice and data without voice through the second IP interface 18. The RTP transmission processor 14 has a function of extracting data with voice corresponding to the network described in the data with voice 15 and data without voice described in the data without voice 16 based on the DTMF transmission instruction from the SIP control task 11 or the RTP control task 12 and loading the data on RTP as the DTMF data. The data with voice and the data without voice are set corresponding to the compression method of the respective network.

The data with voice 15 is, for example data stored in a memory, and is the description data on information with voice (voice information for each push-button (DTMF) of 0 to 9, #, *, A to D) suited to the opposite network corresponding to the data such as the type of DTMF, a reproduction period, etc., loaded in the coded DTMF information received by the RTP receiving processor 13. That is to say, the information with voice is described corresponding to each of the voice compression methods or the voice coding methods, etc., for each opposite networks.

The data without voice 16 is, for example data stored in a memory, and is the description data on information without voice suited to the opposite network corresponding to the information such as the type of DTMF, a reproduction period, etc., loaded in the coded DTMF information received by the RTP receiving processor 13.

The first IP interface 17 is an interface for transmitting/receiving coded DTMF information and RTP voice packets with the SIP server 30 disposed at one of the networks.

The second IP interface 18 is an interface for transmitting/receiving coded DTMF information and RTP voice packets with the SIP server 30 disposed at the other of the networks.

In the SIP converter 10, after a session is established between the SIP terminals 41A-1 to 41A-3 of the first network 20A and the SIP terminals 41B-1 to 41B-3 of the second network 20B, the RTP control task 12 performs RTP transmission/receiving and the SIP control task 11 performs monitoring the SIP method. When the first IP interface 17 receives the coded DTMF information ([INFO] method), the first IP interface 17 notifies the SIP control task 11 of the coded DTMF information ([INFO] method). The SIP control task 11 determines whether it is possible to transmit the coded DTMF information ([INFO] method) to the destination network as the coded DTMF information ([INFO] method). When it is possible to transmit to the other network, which is the destination, as the coded DTMF information ([INFO] method), a determination is made on whether the coded DTMF information ([INFO] method) can be transmitted to the other network as the coded DTMF information ([INFO] method) without change. If the coded DTMF information ([INFO] method) can be transmitted without change, the coded DTMF information ([INFO] method) is transmitted from the second IP interface 18. If address conversion is necessary, the address of the coded DTMF information ([INFO] method) is converted and then is transmitted from the second IP interface 18.

When it is not possible to transmit the coded DTMF information ([INFO] method) received from the first IP interface 17 to the destination network as the coded DTMF information ([INFO] method), the SIP control task 11 instructs the RTP control task 12 to transmit the DTMF.

The RTP control task 12 that has received the DTMF transmission instruction causes the RTP transmission processor 14 to calculate data with voice and data without voice from the information of the type of the DTMF and the reproduction time described in the coded DTMF information ([INFO] method), obtain the data with voice suited to the destination from the data with voice 15, at the same time, obtain the data without voice from the data without voice 16, created the DTMF data, load the data on a RTP voice packet, and transmit the packet to the second IP interface 18. Thus, it is possible to load the DTMF data on an RTP voice packet to transmit to the destination network.

Also, when the RTP control task 12 receives the coded DTMF information (RPT storing the coded DTMF information) received from the first IP interface 17, if the RTP control task 12 determines that it is not possible to transmit to the SIP terminal of the destination network as the coded DTMF information (RPT storing the coded DTMF information), it is recognized to be necessary to transmit the DTMF voice data by RTP, the RTP control task 12 calculates data with voice and data without voice from the information of the type of the DTMF and the reproduction time described in the coded DTMF information ([INFO] method), obtains the data with voice suited to the destination from the data with voice 15, at the same time, obtains the data without voice from the data without voice 16, creates the DTMF data, loads the data on a RTP voice packet, and transmits the packet to the second IP interface 18.

Also, when an RTP is received by the first IP interface 17, which is the receiving side of the coded DTMF information ([INFO] method) and the RTP receiving processor 13 is notified, the received RTP is discarded in order for the RTP of unnecessary voice to be transmitted to the second IP interface 18 during the transmission of the DTMF.

Figure 6:
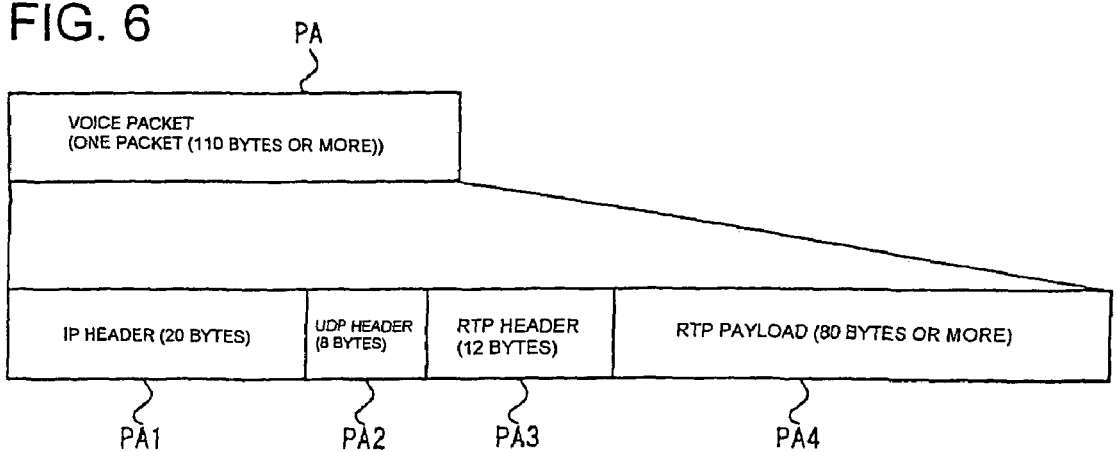
FIG. 6 is an explanatory diagram illustrating the structure of a voice packet.

FIG. 6 is an explanatory diagram illustrating the structure of an RTP voice packet. The voice packet PA includes a 20-byte IP header PA1, an 8-byte UDP header PA2, a 12-byte RTP header PA3, and an RTP payload PA4 having different size (minimum 80 bytes) depending on the payload type. Here, a description is given of the case of a voice packet using the UDP. However, this is not limited to the UDP, and the TCP may be used. The length of the RTP payload PA4 is determined by the payload of the session information described in the SDP, etc., and the packetized cycle. For example, in the case of G.711, in which the voice coding method is recommended by ITU-T (International Telecommunication Union-Telecommunication sector), 10 ms (one multiple), since in G.711, the transmission rate is 64 kbit/s, and thus 80-byte data is transmitted for each 10-ms cycle.

FIG. 7 illustrates a system for DTMF transmission by RTP of the present invention. Here, an example is given of the DTMF transmission by receiving the coded DTMF information of data with voice 70 ms in the case of G.711, 10 ms (one multiple). The data with voice DA becomes 560 bytes in the case of G.711. The transmission is performed for each 10 ms because of one multiple with a cycle of 10 ms, and thus data with voice of 560 bytes is divided into 7 pieces of 80-byte data with voice DA1 to DA7. One packet is transmitted for each 10 ms out of the seven packets with voice PAA1 to PAA7, which are produced by adding an IP header, an UDP header, and an RTP header to the divided data with voice DA1 to DA7.

In this system, data without voice is assumed to be the data produced by subtracting data with voice from 120 ms. However, if the data without voice is below 40 ms, 40 ms is ensured. This is because the DTMF transmission rule of a PBX specifies that the minimum pose is 30 ms or more and the cycle is 120 ms. Thus, the data without voice DS becomes 50 ms, which is obtained by subtracting the data-with-voice portion from the 120 ms, and thus becomes 40 bytes. Here, transmission is performed for each 10 ms, and thus 400-byte data without voice is divided into 5 pieces of 80-byte data without voice DS1 to DS5. The five packets without voice PAS1 to PAS2, which are produced by adding an IP header, an UDP header, and an RTP header to the divided data without voice DS1 to DS5, are transmitted. As described above, by transmitting the packet without voice PAS5 from the packet with voice PAA1 for each 10 ms, it is possible to transmit DTMF using the voice packet PA on RTP.

As described above, as an embodiment of the present invention, a description has been given of the case where the "coded DTMF information" is assumed to be the "[INFO] method" coded in a predetermined format (information such as the type of DTMF, the reproduction time, etc., is represented by data) different from voice data or the "RTP storing coded DTMF information". However, the idea of the present invention is not limited to this. That is to say, the present invention includes a technical idea in which DTMF is reliably transmitted without being conscious of supporting or unsupporting of the coded DTMF information processing in SIP terminals by providing various kinds of relay apparatuses installed in a network system employing coding DTMF by any SIP terminal in communication between SIP terminals in a predetermined format (information such as the type of DTMF, the reproduction time, etc., is represented by data) different from voice data in order to relay the communication between the SIP terminals with a function of converting the coded DTMF information into DTMF voice data (RPT).

What is claimed is:

1. A method for DTMF (Dual Tone Multi-Frequency) transfer between different address systems in a communication system containing a first network including an SIP server using SIP (Session Initiation Protocol) and an SIP terminal connected to the SIP server through a network, a second network including an SIP server using SIP and an SIP terminal connected to the SIP server through a network, and an SIP converter for connecting the first network and second network, the method comprising:

while a session is established between the first-network SIP terminal and the second-network SIP terminal, the SIP converter determining whether the SIP terminal of the other of the networks supports coded DTMF information when the SIP converter detects the coded DTMF information from one of the networks; and after producing a voice-data format DTMF information based on a type of DTMF and a reproduction time information of the coded DTMF information, the produced voice-data format DTMF is stored into a payload on RTP (Transport Protocol for Real-Time Applications) and transferred to the other of the SIP terminals, and then data without voice with respect to more than a predetermined time, is stored into a payload on RTP and transferred to the other of the SIP terminals, if the SIP terminal of the other of the networks does not support the coded DTMF information; and the coded DTMF information is transferred to the SIP terminal of the other of the networks if the SIP terminal of the other of the networks support the coded DTMF information.

2. The method for DTMF transfer according to claim 1, wherein the SIP terminal of the coded DTMF information receiving side extracts DTMF from the received voice packet on RTP.

3. The method for DTMF transfer according to claim 1, wherein a determination on whether or not the SIP terminal of the other of the networks supports coded DTMF information is made by the determination of the Allow header in the method received before the coded DTMF information is received.

4. The method for DTMF transfer according to claim 1, wherein a header of the voice packet on RTP is an UDP header.

5. The method for DTMF transfer according to claim 1, wherein a header of the voice packet on RTP is a TCP header.

6. The method for DTMF transfer according to claim 1, wherein the SIP terminal of the coded DTMF information receiving side extracts DTMF from the received voice packet on RTP and the payload of the voice packet on RTP is changed by SIP session information.

7. The method for DTMF transfer according to claim 1,
wherein the SIP terminal of the coded DTMF information receiving side extracts DTMF from the received voice packet on RTP and a header of the voice packet on RTP is an UDP header.

8. The method for DTMF transfer according to claim 1,
wherein the SIP terminal of the coded DTMF information receiving side extracts DTMF from the received voice packet on RTP and a header of the voice packet on RTP is a TCP header.

9. An SIP relay apparatus for relaying communication between a first SIP terminal using SIP (Session Initiation Protocol) and a second SIP terminal, the SIP relay apparatus comprising:

a function of determining whether the other of the SIP terminal supports coded DTMF (Dual Tone Multi-Frequency) information when the SIP relay apparatus detects the coded DTMF information from one of the SIP terminals while a session is established between the first SIP terminal and the second SIP terminal; and a function of storing a produced voice-data format DTMF corresponding to the coded DTMF information into a payload on RTP (Transport Protocol for Real-Time Applications) and transferring the information to the other of the SIP terminals after producing a voice-data format based on a type of DTMF and a reproduction time information of the coded DTMF information, and then storing data without voice with respect to more than a predetermined time, into a payload on RTP and transferring to the other of the SIP terminals, if the other of the SIP terminals does not support the coded DTMF information; and a function of transferring the coded DTMF information to the SIP terminal of the other of the networks if the SIP terminal of the other of the networks support the coded DTMF information.

\* \* \* \* \*